US009476963B2

(12) United States Patent
Cyganski et al.

(10) Patent No.: US 9,476,963 B2
(45) Date of Patent: Oct. 25, 2016

(54) SEARCH AND RESCUE METHOD AND SYSTEM

(76) Inventors: David Cyganski, Holden, MA (US); R. James Duckworth, Shrewsbury, MA (US)

( * ) Notice: Subject to any disclaimer, the term of this patent is extended or adjusted under 35 U.S.C. 154(b) by 1038 days.

(21) Appl. No.: 13/642,319

(22) PCT Filed: Apr. 25, 2011

(86) PCT No.: PCT/US2011/033785
§ 371 (c)(1),
(2), (4) Date: Jan. 7, 2013

(87) PCT Pub. No.: WO2011/133974
PCT Pub. Date: Oct. 27, 2011

(65) Prior Publication Data
US 2013/0099975 A1    Apr. 25, 2013

Related U.S. Application Data

(60) Provisional application No. 61/327,362, filed on Apr. 23, 2010, provisional application No. 61/372,541, filed on Aug. 11, 2010.

(51) Int. Cl.
*G01S 3/14* (2006.01)
*G08B 21/02* (2006.01)
(Continued)

(52) U.S. Cl.
CPC .................. *G01S 3/146* (2013.01); *G01S 3/28* (2013.01); *G01S 5/0205* (2013.01); *G01S 11/06* (2013.01); *G08B 21/0263* (2013.01); *H01Q 21/24* (2013.01); *H01Q 21/28* (2013.01)

(58) Field of Classification Search
CPC ...... G08B 21/0263; G01S 3/146; G01S 3/28
See application file for complete search history.

(56) References Cited

U.S. PATENT DOCUMENTS 4,054,881 A * 10/1977 Raab ...................... G01B 7/004
324/227
4,346,384 A * 8/1982 Raab ......................... G01S 3/14
342/451

(Continued)

FOREIGN PATENT DOCUMENTS

EP         0766096 A2     4/1997

OTHER PUBLICATIONS

International Search Report dated Dec. 7, 2011 for International Application No. PCT/US11/33785.

(Continued)

*Primary Examiner* — Gregory C Issing
(74) *Attorney, Agent, or Firm* — Burns & Levinson LLP; Orlando Lopez

(57) ABSTRACT

A method for locating a transmitter using a receiver which include, but are not limited to the steps of transmitting a plurality of distinctive and orthogonally polarized signals from a transmitter; receiving the transmitted signals at a pair of separated antennas; demodulating the distinctive orthogonal signals received at each of the pair of separated antennas; and determining a direction to the transmitter from the signals received at the pair of antennas. The system for determining the location of a transmitter using a receiver includes, but is not limited to, having a transmitter adapted for orthogonally transmitting a plurality of distinctive signals; a receiver having a pair of separated antennas for receiving the orthogonally transmitted signals; separate demodulators in the receiver for each antenna of the pair of separated antennas for demodulating the distinctive signals; and signal processing circuitry in the receiver adapted for using the demodulated distinctive signals for determining a direction to the transmitter.

32 Claims, 15 Drawing Sheets

(51) Int. Cl.
*G01S 3/28* (2006.01)
*G01S 5/02* (2010.01)
*G01S 11/06* (2006.01)
*H01Q 21/24* (2006.01)
*H01Q 21/28* (2006.01)

(56) References Cited

U.S. PATENT DOCUMENTS

| | | | | |
|---|---|---|---|---|
| 4,737,794 A | * | 4/1988 | Jones | F41G 3/225 |
| | | | | 342/386 |
| 5,170,172 A | * | 12/1992 | Weinstein | A01K 15/023 |
| | | | | 340/573.1 |
| 5,307,072 A | * | 4/1994 | Jones, Jr. | F41G 3/08 |
| | | | | 324/244 |
| 5,425,382 A | * | 6/1995 | Golden | A61B 5/06 |
| | | | | 128/899 |
| 5,847,679 A | | 12/1998 | Yee et al. | |
| 6,642,888 B2 | | 11/2003 | Kishigami et al. | |
| 7,005,980 B1 | * | 2/2006 | Schmidt | G08B 25/016 |
| | | | | 340/539.13 |
| 7,015,859 B2 | * | 3/2006 | Anderson | A61B 5/06 |
| | | | | 342/450 |
| 2006/0293023 A1 | | 12/2006 | Levitan | |
| 2007/0202927 A1 | | 8/2007 | Pfleging et al. | |

OTHER PUBLICATIONS

Written Opinion dated Dec. 7, 2011 for International Application No. PCT/US11/33785.
International Preliminary Report on Patentability dated Oct. 23, 2012 for International Application No. PCT/US11/33785.
Examiner Requisition for Canadian Patent Application 2,797,044, dated Mar. 19, 2016.

* cited by examiner

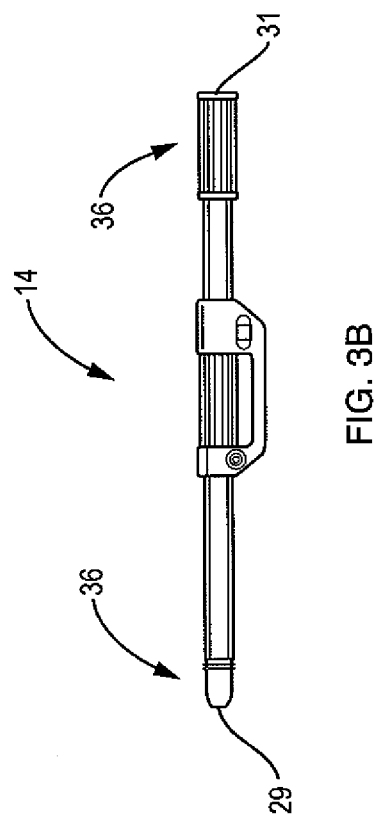
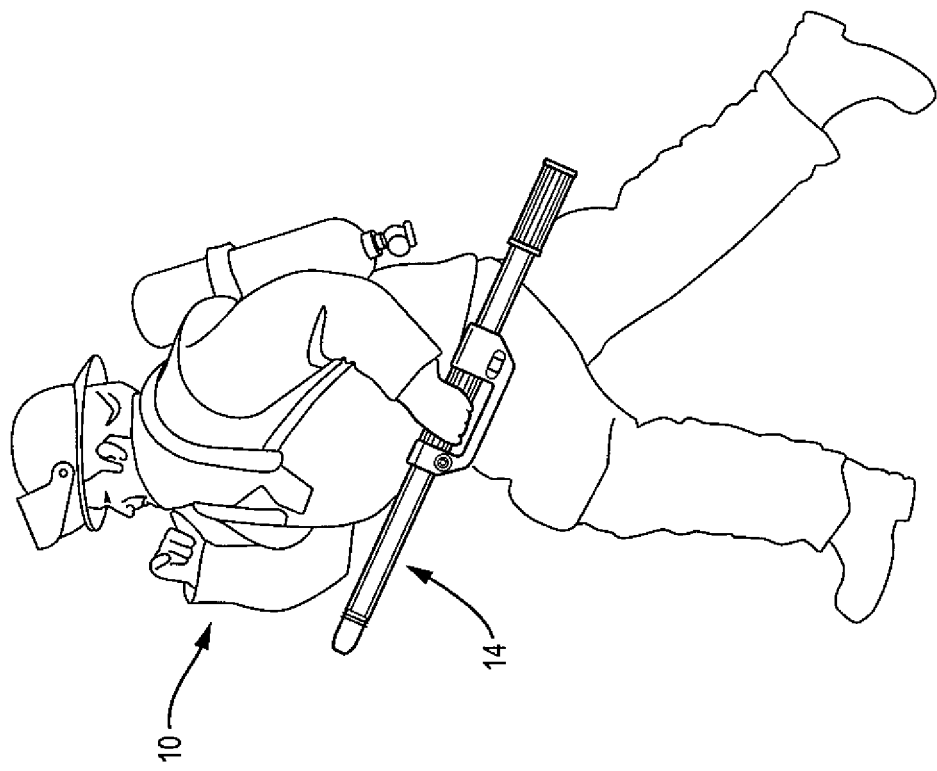

US 9,476,963 B2

SEARCH AND RESCUE METHOD AND SYSTEM

CROSS-REFERENCE TO RELATED APPLICATIONS

This application is a U.S. national stage application under 35 U.S.C. 371 of co-pending International Application No. PCT/US11/33785 filed on Apr. 25, 2011 and entitled SEARCH AND RESCUE METHOD AND SYSTEM, which in turn claims priority to U.S. Provisional Patent Application No. 61/327,362 file don Apr. 23, 2010, and U.S. Provisional Patent Application No. 61/372,541 filed on Aug. 11, 2010, all of which are incorporated by reference herein in their entirety for all purposes.

STATEMENT REGARDING FEDERALLY SPONSORED RESEARCH OR DEVELOPMENT

This invention was made with government support under Contract No. NIJ 2003-U-CX-K-025 awarded by The National Institute of Justice. The government has certain rights in the invention.

BACKGROUND OF THE INVENTION

Embodiments of the present invention deal with a low cost effective system for locating missing objects such as fire fighters, first responders, miners, divers and the like in a hard to see location such as through walls, smoke and under debris and the like during a fire fighting operation, a mine, underwater and the like.

It is extremely difficult to find objects such as fire fighters in an environment such as a smoke filled building which has maze like layouts and underground passages. Some prior radio-based homing systems require the user to move over a large arc and to keep track of the changes in signal strength during this motion to deduce the possible location of the target via a non-intuitive process, while others have little ability to penetrate building materials such as aluminium siding and concrete with metal reinforcement. Furthermore, this process can be thwarted by changes in the position/orientation of the target and by metallic content in the building.

In a review of almost 3,400 US firefighter Line of Duty Deaths (hereinafter "LODD") between 1977 and 2006 (Firefighter Fatalities Studies 1977-2006, NFPA Journal, July/August 2007, Fahey et al.), deaths due to traumatic injury while operating inside structures have shown little improvement over the time period, when corrected for the change (decline) in the number of structural fires. Indeed this observation is borne out again as "In 2008 One-hundred and eighteen (118) firefighters died while on duty in 2008, the same number of firefighter fatalities as the previous year," according to the U.S. Fire Administration's report "Firefighter Fatalities in the United States in 2008" published in September 2009.

An analysis of the 102 firefighter LODDs in 2007 (Firefighter Fatalities in the United States—2007, NPFA, July 2008, Fahey et al), shows that, after cardiac events (40) and being struck by an object (32), the leading cause of death was being caught or trapped on the fire ground, accounting for 23 of the 102 fatalities. The situation is even more serious for the career firefighter for whom deaths due to being lost or trapped were 43% of total deaths, whereas they represented only 5% of volunteer deaths.

SUMMARY OF THE INVENTION

The search and rescue system and method (a.k.a. Mantenna™ at certain times during the description of various embodiments of the invention) is in certain embodiments a low cost firefighter-deployed directional through-wall homing device that can be used to achieve speed-up of rescue operations in, for example, a smoke filled fire. The search and rescue system uses novel designs of both the transmit and receive antennas, novel signalling scheme, and signal processing algorithms or methods to provide distance and direction information leading to the, for example, fallen fire-fighter regardless of the orientation of the fallen firefighter's transmitter unit or the distance of the receiver from the unit. The range and direction information is available at any moment to the rescuer. This approach is a significant improvement on avalanche locators and other commercial fire-fighter radio based location systems, which simply use ordinary "radio direction finding".

The very low frequency (VLF) near field radio signals used by the search and rescue system of this embodiment have properties such that metal and most other objects in a building have relatively low impact on the Near Field component of the radio signal, unlike the Radiation field component which is commonly used by radio location and other homing systems. This property makes the use of Near Field ideal for use in nearly any type of building which exists today, even fully metallic buildings.

The intended application of the search and rescue system is to reduce the number of injuries and Line of Duty Deaths (LODDs) of, for example, fire fighters from traumatic injuries while operating inside structures, especially those due to burns, smoke inhalation, stress, and becoming lost, trapped or being enmeshed by a collapsed building. The goal of this project is motivated by findings of several studies that connect Line of Duty Deaths with traumatic injuries while operating inside structures.

More specifically set forth below are descriptions of the various embodiments of the system and method of this invention.

One of the embodiments of the present invention provides for a method which can be used for search and rescue by locating a transmitter using a receiver which includes the steps of transmitting a plurality of distinctive and orthogonally polarized signals from a transmitter; receiving the transmitted signals at a pair of separated antennas; demodulating the distinctive orthogonal signals received at each of the pair of separated antennas; and determining a direction to the transmitter from the signals received at the pair of antennas. More particularly, the following steps further implement the search and rescue method described above, for example the step of determining includes combining signal amplitude levels of the demodulated signals received for each respective antenna of the pair of separated antennas and indicating to a user the difference between the combined signal amplitude levels from the separated antennas or some function of that difference. The step of determining includes using received noise levels for adjusting the combined signal amplitude levels and the step of determining can also include aligning the pair of antennas to maximize the difference between the combined signal amplitude levels of the pair of antennas to estimate a direction to the transmitter. The method further can include the step of estimating a distance to the transmitter from the receiver from the difference in the combined signal amplitude levels and wherein the step of transmitting uses three orthogonally polarized signals or uses three magnetic dipole antennas or three electrical dipole antennas. The step of transmitting can include varying the distinctive signals by different frequencies, by time division multiplexing or by code division multiplexing wherein the step of varying the distinctive signals includes sufficient distinction to enable differentiation between a plurality of transmitters in the step of receiving and wherein the step of receiving uses the near-field portion of the transmitted signals, wherein the step of receiving uses a radiation field portion of the transmitted signals to approximate a location for the transmitter from a greater distance than the near-field portion, wherein the step of receiving uses gain control circuits for receiving the transmitted signals, wherein the step of determining uses algorithmic compensation for processing near-field portions of the transmitted signals, wherein the steps of receiving, demodulating and determining are performed by a plurality of receivers in communication with each other, and further include the step of triangulating a location for the transmitter at one or more of the plurality of receivers. Furthermore, the step of transmitting is activated by a predetermined period of non-movement of the transmitter. In addition, the transmitter may be located with respect to an object to be located and where the receiver may be located with respect to the user, and wherein the object is a firefighter.

Another of the embodiments provide for a system for determining the location of a transmitter using a receiver, that is, a search and rescue system which includes a transmitter adapted for orthogonally transmitting a plurality of distinctive signals; a receiver having a pair of separated antennas for receiving the orthogonally transmitted signals; separate demodulators in the receiver for each antenna of the pair of separated antennas for demodulating the distinctive signals; and signal processing circuitry in the receiver adapted for using the demodulated distinctive signals for determining a direction to the transmitter. The signal processing circuitry is adapted to combine signal amplitude levels of the separate demodulated signals received for each respective antenna. Further, an indicator is adapted to show a user of the receiver the relative difference between combined signal amplitude levels between the pair of separated antennas, wherein the signal processing circuitry is adapted to use received noise levels for adjusting the combined signal amplitude levels, wherein the pair of separated receiving antennas may be oriented with respect to each other to maximize the difference between the combined signal amplitude levels of the pair of separated antennas to estimate a direction to the transmitter, wherein the signal processing circuitry is adapted to estimate a distance to the transmitter from the receiver from a maximized difference in the combined signal amplitude levels, wherein the pair of separated receiving antennas are mounted to a single instrument to enable easy directional reorientation, wherein the pair of antennas is mounted to the receiver using at least one extendable member to provide separation between the pair of antennas during use and for compacting the receiver between uses, wherein the transmitter includes three orthogonally oriented antennas for transmitting three orthogonal signals and wherein the three transmitting antennas may be three magnetic dipole antennas or three electrical dipole antennas and the three orthogonally oriented antennas may be three coils wound around a cube form, orthogonally to each other. The transmitter is adapted to create the distinctive signals by using either different frequencies, time division multiplexing or code division multiplexing and wherein the distinctive signals are sufficient to enable distinction there between and between a plurality of transmitters at the receiver, wherein the receiver includes gain control circuits for receiving near-field portion of the transmitted signals, wherein the signal processing circuitry includes algorithmic compensation for processing the near-field portion of the transmitted signals. The system also can include a second receiver constructed according to the first receiver and the second receiver is in communication with the first receiver, wherein the signal processing circuitry at one or both receivers includes a triangulation process for determining a location of the transmitter. As with the method the transmitter may be located with respect to an object to be located and where the receiver is located with respect to the user and the object may be a firefighter.

For a better understanding of the present invention, together with other and further needs thereof, reference is made to the accompanying drawings and detailed description and its scope will be pointed out in the appended claims.

BRIEF DESCRIPTION OF THE SEVERAL VIEWS OF THE DRAWING

FIG. 3A represents a pictorial view of the receiver wand in use and the receiver wand alone is set forth pictorially in FIG. 3B;

DETAILED DESCRIPTION OF THE INVENTION

Although the search and rescue system which is described herein mainly deals with firefighters 10, it should be realized that this system is capable of use for a wide variety of objects which may be difficult to locate in situations where visibility is at a minimum. For purposes of ease of understanding, the term firefighter 10 is synonymous with any other object or other personnel, for example, a first responder or the like that is difficult to locate. The search and rescue system improves the speed of, for example, firefighter rescue operations with the intent of reducing the mortality rate from becoming lost, trapped, injured (as when struck) or otherwise incapacitated without immediate aid (as delay exacerbates otherwise survivable cardiac, pulmonary or other injuries. The search and rescue system is a fieldable and low cost firefighter-deployed directional homing device which is capable of use in any situation of impaired vision and can even be used through walls in order to achieve this speed-up of rescue operations on the fire ground.

Figure 1:
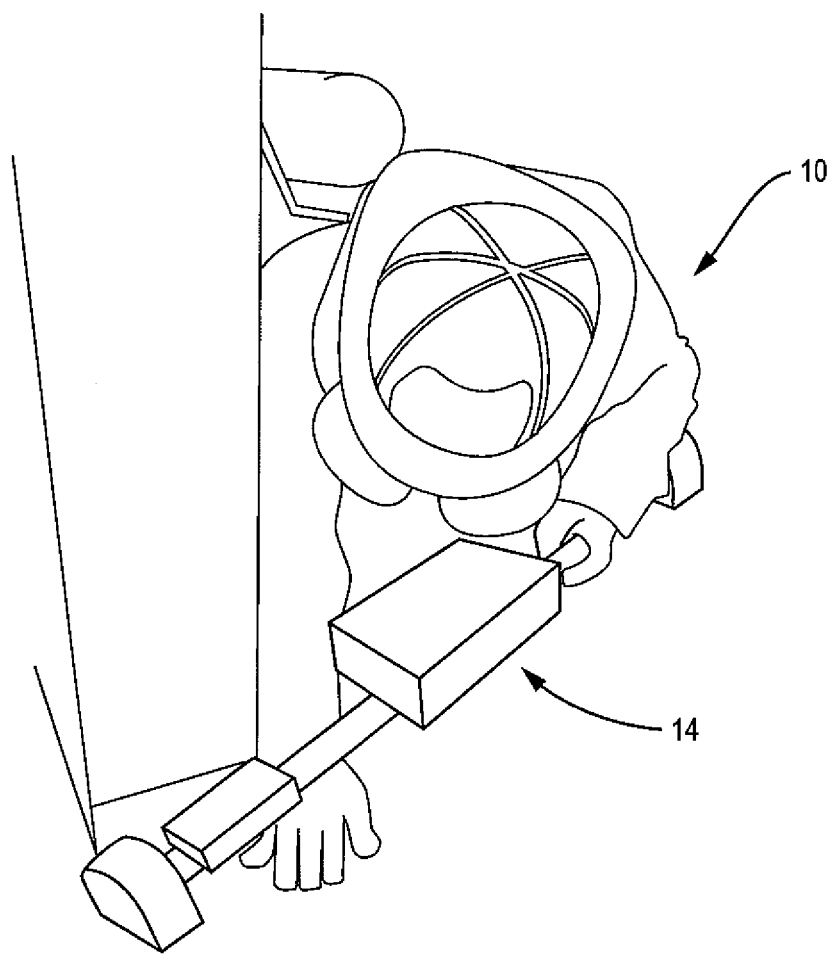
FIG. 1 represents a pictorial view of the present invention wherein the directional receiver wand is shown in use.

An embodiment of the search and rescue system generally includes two components, a small transmitter or transmitter unit 12 worn by the firefighter as part of their turnout gear which acts as a rescue beacon, and a hand-carried detector, as shown in FIGS. 1 and 3A and distance indicating receiver such as wand 14 (see FIGS. 1, 3A and 3B).

The search and rescue system is not an absolute location and tracking system for use by incident commanders, but can be hand-held rescue system which indicates to the rescue team leader the direction and approximate distance to the rescue target. Once the transmitter 12 is activated (by button 15 pressed or automatically from a motion cessation sensor, the wand 14 will detect the transmitted signal and produce an easily interpreted response (aural, visual, etc.) that grows in intensity as the direction of the wand 14 is brought by the user into alignment with the direction to the transmitter beacon and likewise grows as the wand 14 is brought closer to the beacon on the downed firefighter 10. In another embodiment the activation of the transmitter 12 by one first responder 10 could cause the wands 14 on nearby first responders 10 to automatically activate, alerting them to the fact that a comrade is in need of help.

The wand 14 responds in three ways: a bar graph made from intense light emitting diodes lengthens and changes color; a loud ticking that increases in frequency until it becomes a siren of increasing pitch and eventually pulses as the wand approaches within a few feet of the beacon; and an increasing frequency of vibration that can be felt through gloves holding the unit or wand 14. Further embodiments could include: transmitting the same information to a heads up display in the fireman's mask or into a vibration device or other sense producing device inside a fireman's glove, shirt, etc.

An embodiment of the search and rescue system enables the rescue team to simply follow its audible/visual cues to find a lost or injured comrade from distances of approximately 25 meters, depending on the frequency of the device, through the walls and floors of a building of any construction (residential or industrial), even those clad with aluminum siding, insulating foils or other metallic materials. In addition the search and rescue system has been shown to be capable of sensing-through thick concrete and soil, lending support to rescues in basements, under debris and even collapsed holes and tunnels. Within a short time such as approximately 3-10 minutes of training an embodiment as described above should be able to scope the location of, for example, lost fire fighters 10.

A version of the transmitter 12 is small enough to fit into a firefighter's 10 turnout gear pocket. It is most likely that such a unit or transmitter 12 will be a compact, rugged, lightweight, battery-operated device that is worn on the exterior of a firefighter's turnout gear. The receiver or wand 14 is a rugged, lightweight, battery-operated device that is handheld by the Rapid Intervention Team. If the wand 14 were made sufficiently small and light then it could snap to the turn-out gear, belt or breathing apparatus and be carried by every fire fighter 10 or the like for immediate rescue of nearby comrades.

Figure 2A:
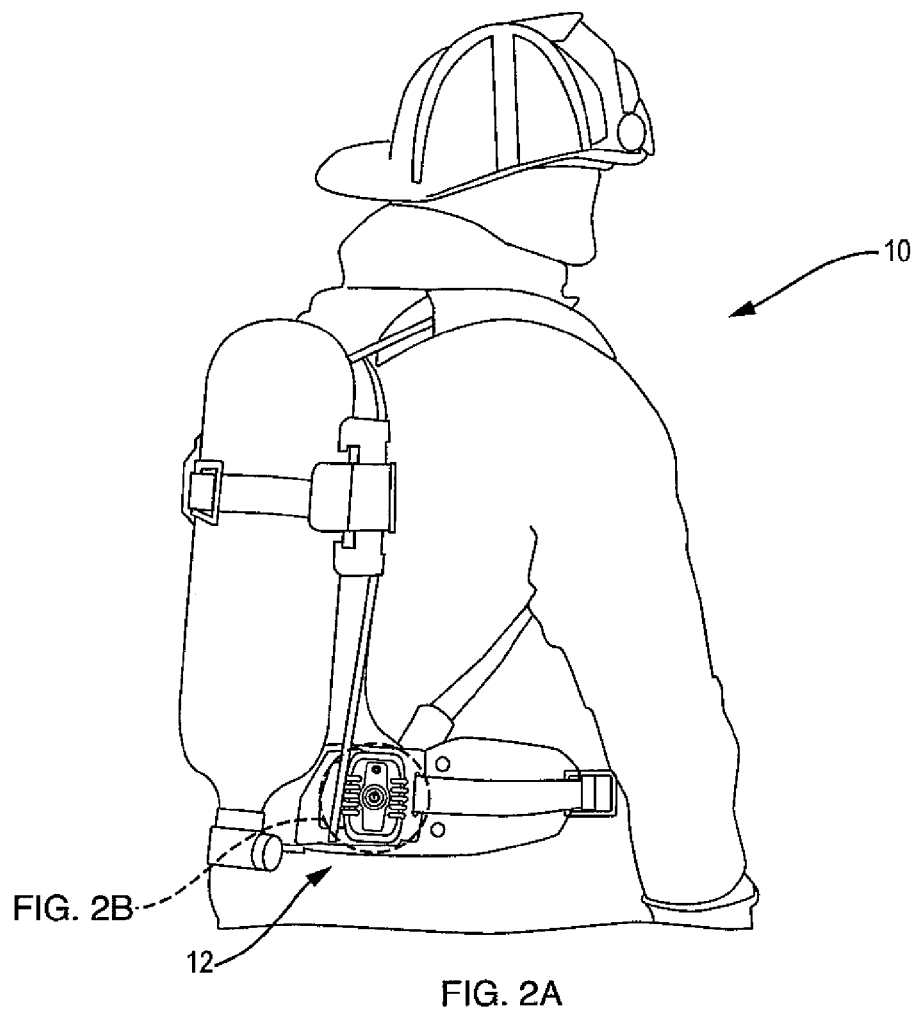
FIGS. 2A and 2B represent pictorial views of the transmitter beacon location on a firefighter and the transmitter, respectively.

A version of the transmitter 12 can be a compact, rugged, lightweight, battery operated device that is worn on the exterior of a firefighter's turnout gear as shown in FIG. 2A. The receiver or wand 14 may be a rugged, lightweight, battery-operated device that is handheld by the Rapid Intervention Team as shown in FIG. 3A. Once inside a building the rescue team can proceed directly to a lost fire-fighter by following audio and visual clues supplied by the system.

An example of the receiver (or search wand 14) is shown in FIGS. 3A, 3B, 12 and 15. One can use, for example, but not limited thereto, an analog front-end circuit and a general purpose Digital Signal Processing (DSP) board to implement a software radio implementation. The receiver or wand 14 may also be implemented with a fully analog system, a fully digital system or some combination. An electronic design may be optimized with respect to reduction in size, weight and power consumption (hence battery size) however while the length of the wand 14 can vary, for example, it could typically be chosen in the range of between ½-3 meters to allow easy use outside and within buildings but not significantly shorter as. lessening the length lessens the distance at which it is capable of detecting the transmitter as it is the difference in a measure of field strengths between the ends of the wand 14 that allow it to determine the preferred direction for search of the transmitter unit. For every firefighter 10 to "wear" a wand 14 for immediate use, it could be shrunk to about 12 to 18 inches in length. While this may reduce the distance for effective homing, the main application of wand 14 could be homing to a "partner" in a closely spaced fire attack or search team who has just become disoriented or incapacitated—hence the range would be sufficient for this purpose.

Figure 2B:
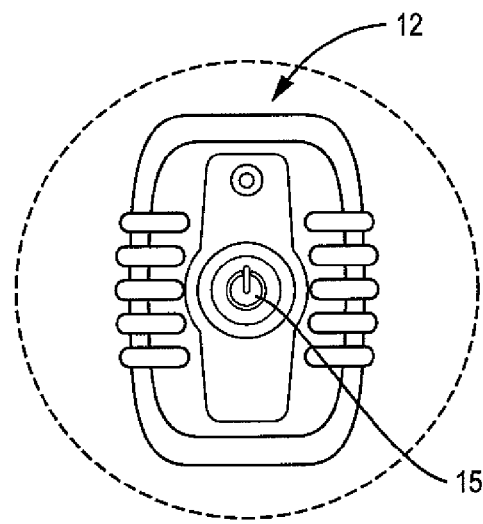
Figure 11:
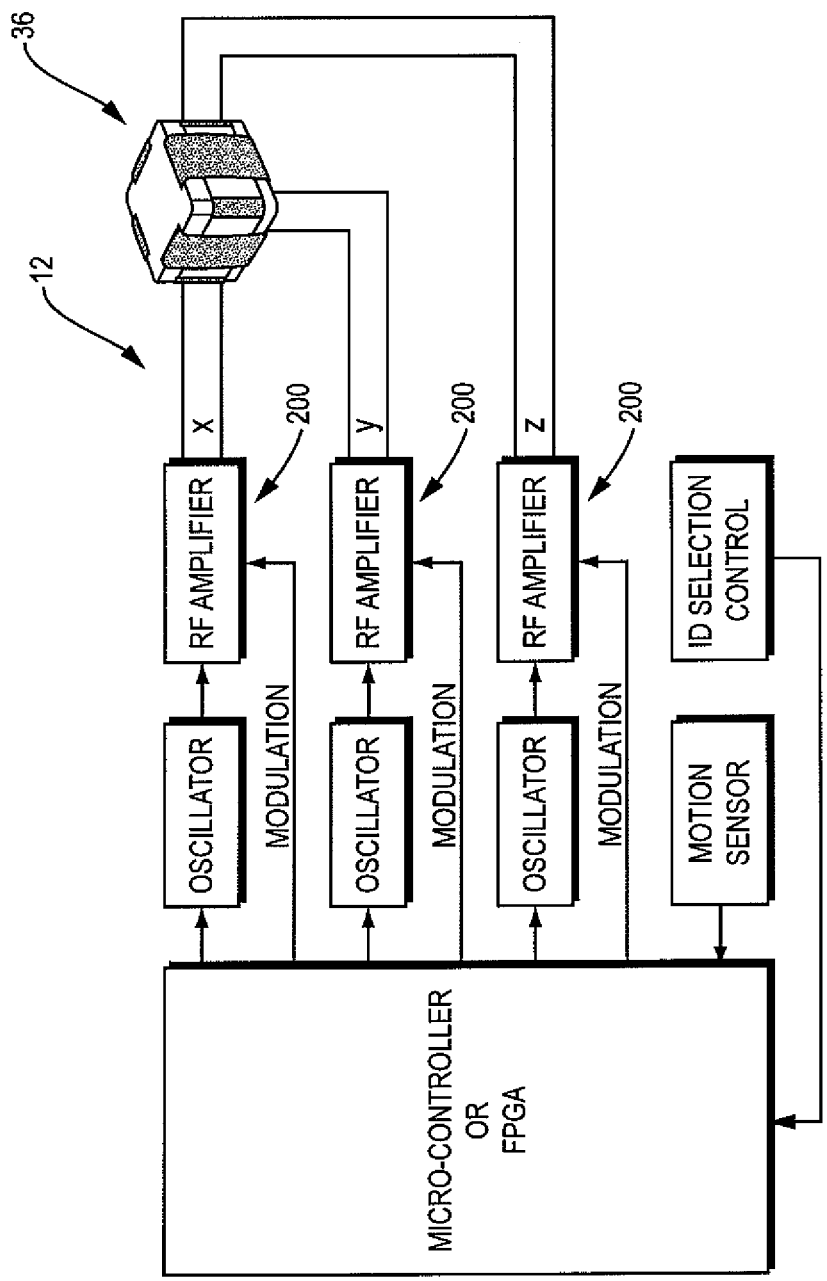
FIG. 11 represents schematic, block diagram of a microcontroller or field programmable gate array (FPGA) embodiment of this embodiment of the transmitter with modulation capability.

The transmitter 12 (beacon) carried by each firefighter 10 produces, for example, but is not limited to, a very low frequency radio signal that is amplified and transmitted using a transmitting antenna complex 26 or 36. This antenna complex comprises three orthogonal antennas, each transmitting a distinct and later separable signal. The transmitter 12 shown in FIGS. 2A and 2B can be greatly reduced in size for convenient integration into, for example, a firefighter" uniform. Additionally, circuits such as shown in FIG. 11 could be added to the transmitter 12 to provide for automatic activation on sensing a sufficient period of inactivity by the fire fighter 10. It is projected that the transmitter 12 can be reduced to a size of about 3"×2"×1.5" and will weigh only a few ounces, although it should be realized this size is only an example and other sizes can result. The search and rescue system can be summarized as follows, and will be expanded upon below:

The magnetic field component of the near field of a low frequency electromagnetic antenna has great penetration capability through both dielectric and conductive materials.

A signaling technique as described hereinafter can be used to overcome the effects of the dipole field pattern of an otherwise non-directive antenna, which ordinarily makes the field amplitude around a source a function of the orientation of that source with respect to the receiving antenna as shown, for example, but not limited to, FIGS. 5 and 6. Three orthogonal signals (for example, at three different frequencies), orthogonally polarized may be transmitted by the transmitter 12, simultaneously, using three orthogonal dipole antennas recognizing that in the near field, three independent polarizations exist and may be excited. These three signals, received by a single antenna 22 at the receiver or wand 14 can be separated and then combined to form a single signal whose amplitude is invariant with respect to the orientation of the transmitter 12—in effect mimicking the outcome of receiving a signal from a truly omnidirectional antenna.

The very rapid fall off of the near field amplitude (a function of $1/r^3$) as a function of radial distance (r) from a source (antenna), as opposed to the $1/r$ fall off for the radiation field makes it possible to determine both the relative distance from the source and direction to the source by sampling the value of the amplitude at two separated points on either end of a length of wand 14 and comparing the two amplitudes as a function of the orientation of the rod as it is swung about its center. The difference will be maximized when the axis of the rod is aligned with the direction to the source and the size of the difference falls off at approximately $1/r^4$ with distance. Thus turning the rod until the difference is maximized yields the direction (along the length of the rod) and an indication of the relative distance (a function of the differences in the amplitudes.

Interference from man-made noise such as from power-line noise and harmonics, switching power supplies in office or consumer electronics, or from electrical machinery, to name a few, can be ameliorated by receiving signals in channels that share the same general band as the source signal but are orthogonal to the sources' signals. The amplitude of the interfering signals at the rod-ends can be used to discount such man made sources as the target source.

The above list, although not limited thereto, expresses examples of a particular reduction to practice of the general enabling ideas. In the following, various alternatives will also be described.

Figure 4:
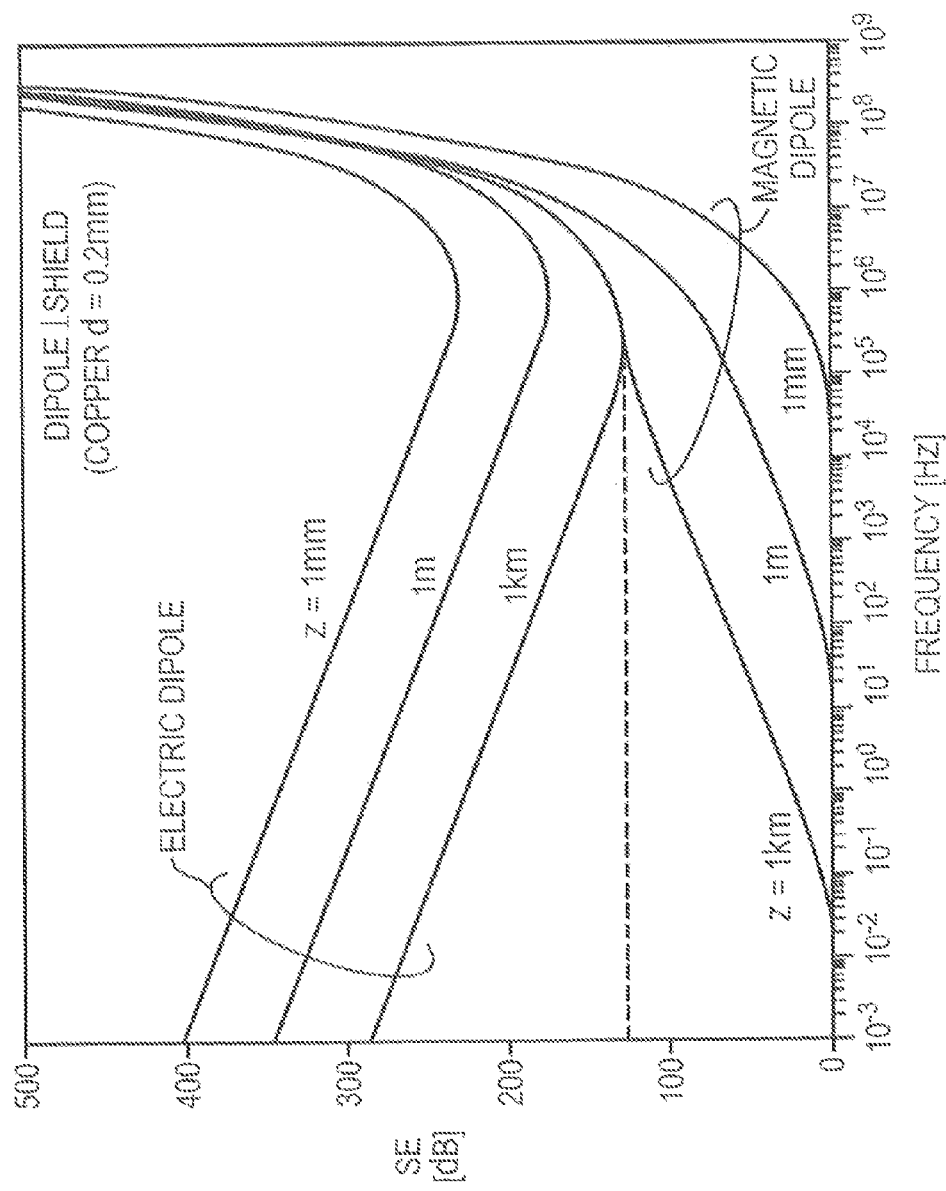
FIG. 4 represents a graph of attenuation of electric and magnetic field components. (this graph appears as FIG. 7 in "Analysis for Electromagnetic Leakage through a Plane Shield with an Arbitrarily-Oriented Dipole Source", Atsuhiro Nishikata and Akira Sugiura, Member, IEEE Trans. On Electromagnetic Compatibility Vol. EMC-34, NO. 1, February 1992); Different kinds of shielding effectiveness as functions of frequency, with dipole source perpendicular to the shield (0.2 mm thick copper shield is assumed).

The shielding effectiveness of a thin (thickness t) a conducting sheet of infinite area between two parallel, coaxial, magnetic loop (dipole) antennas is given by the equation set forth in Eq. 34 of the paper "New Theoretical Expressions for Predicting Shielding Effectiveness for the Plane Shield Case", Peter R. Bannister, IEEE Trans. on Electromagnetic Compatibility, Vol. EMC-10, No. 1, March 1968, pp. 2-7 which is incorporated herein in its entirety and further explored in "Analysis for Electromagnetic Leakage through a Plane Shield with an Arbitrarily-Oriented Dipole Source", Atsuhiro Nishikata and Akira Sugiura, Member, IEEE Trans. on Electromagnetic Compatibility Vol. EMC-34, NO. 1, February 1992 also incorporated herein in its entirety. FIG. 4 shows that attenuation of the magnetic near field at hundreds of kHz has excellent penetration capability through conductive sheets as compared to high frequency fields, especially as compared to the electric field component.

The search and rescue system operates in, for example, but not limited to, the frequency range of approximately 160 kHz-190 kHz, yielding a near field operating range of approximately 200 meters. Frequencies lower and higher than this can be used with an accompanying change in the near field range (improving with lower frequencies) and antenna efficiency for an antenna of a given size (improving with higher frequencies).

Figure 5:
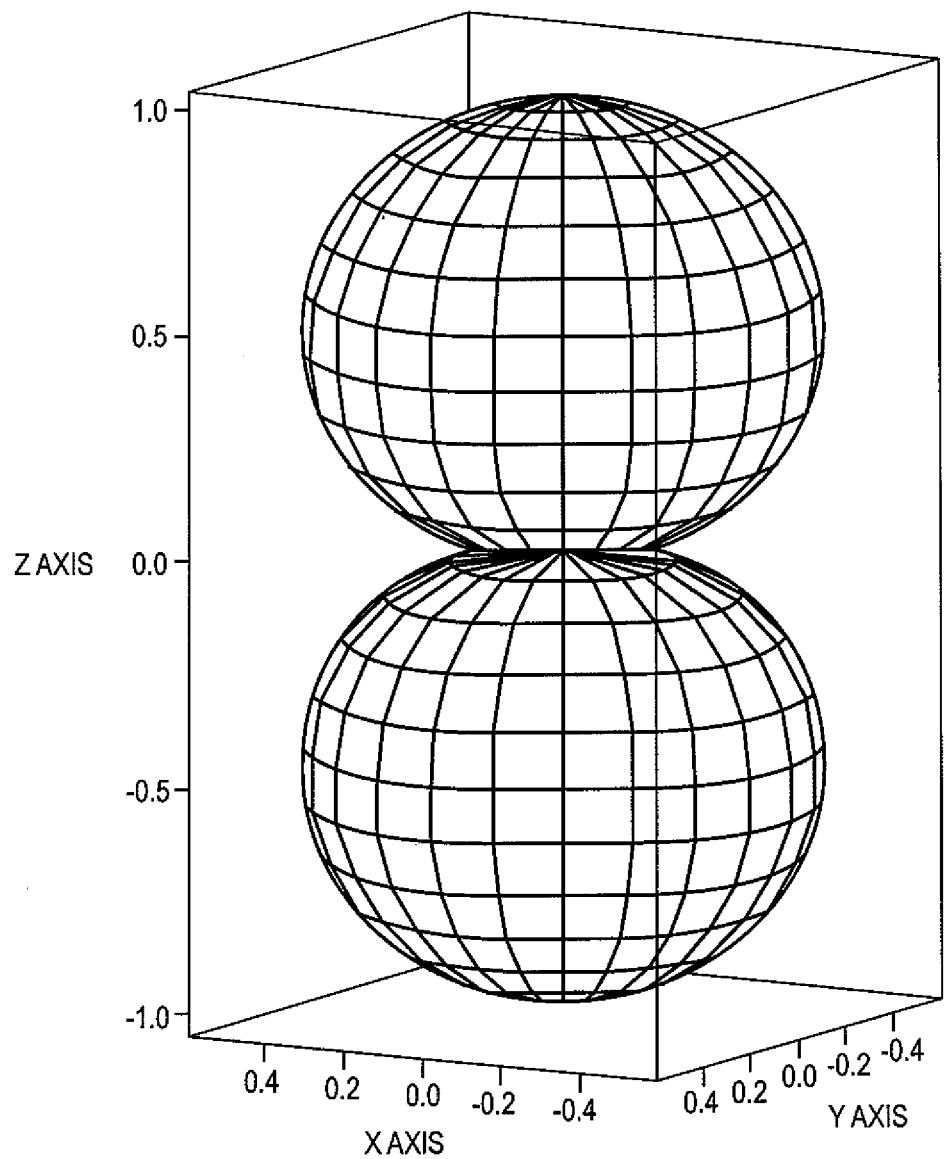
FIG. 5 represents an illustration of an Equi-amplitude near field pattern for a magnetic dipole antenna with axis oriented along the z (vertical) axis.
Figure 6:
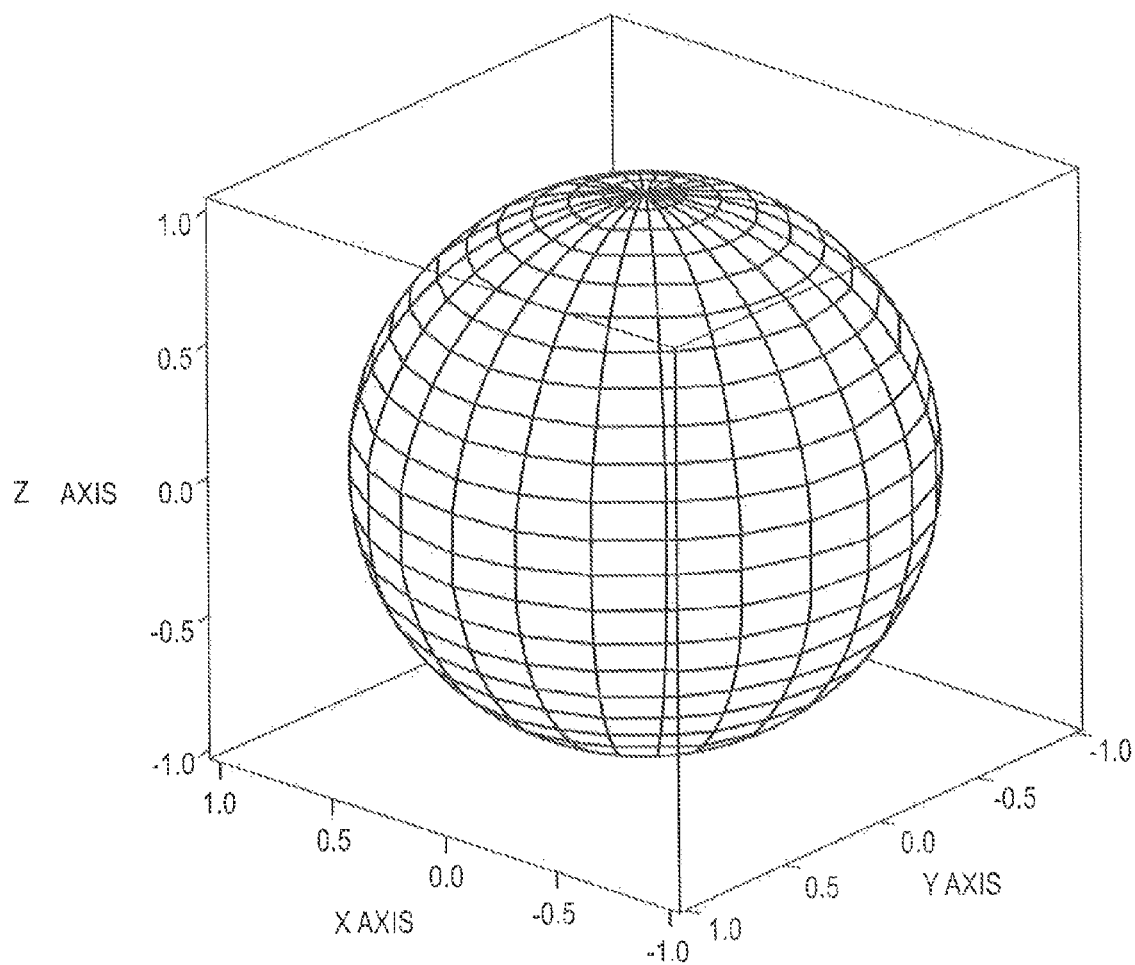
FIG. 6 represents an illustration of an omnidirectional equi-amplitude pattern for the combined envelopes of signals received from a triple of orthogonal magnetic dipole antennas each transmitting an orthogonal signal (or equivalent technique derived from this notion)

Any dipole antenna creates an electromagnetic field which depends upon the distance and direction to the receiver or wand 14 which can be described by an "antenna pattern" diagram such as shown in FIG. 5 where the surface depicts the surface of equi-amplitude field values. Since both a transmitting and a receiving dipole antenna are described by such a pattern, a significant problem for the search and rescue application arises. In operation, for example, firstly, a searcher may begin near the minimum field region or "waist" of the transmitter's field pattern and hence obtain no clue as to the presence or preferred search direction until they have left that location and/or reoriented their receiving antenna. Secondly, if polarization relationships are considered, it can be shown that the searcher will be drawn into a pattern of movement by their attempts to maximize the received signal that has them walk a large arc around the source such that final approach is always towards one of the maximum field transmitting directions of the source. Finally, because of the symmetry of the receiving antenna pattern, there is no notion about which of two directions to prosecute the search until enough distance is covered so that a discernible loss or gain of the signal is perceived.

Figure 13A:
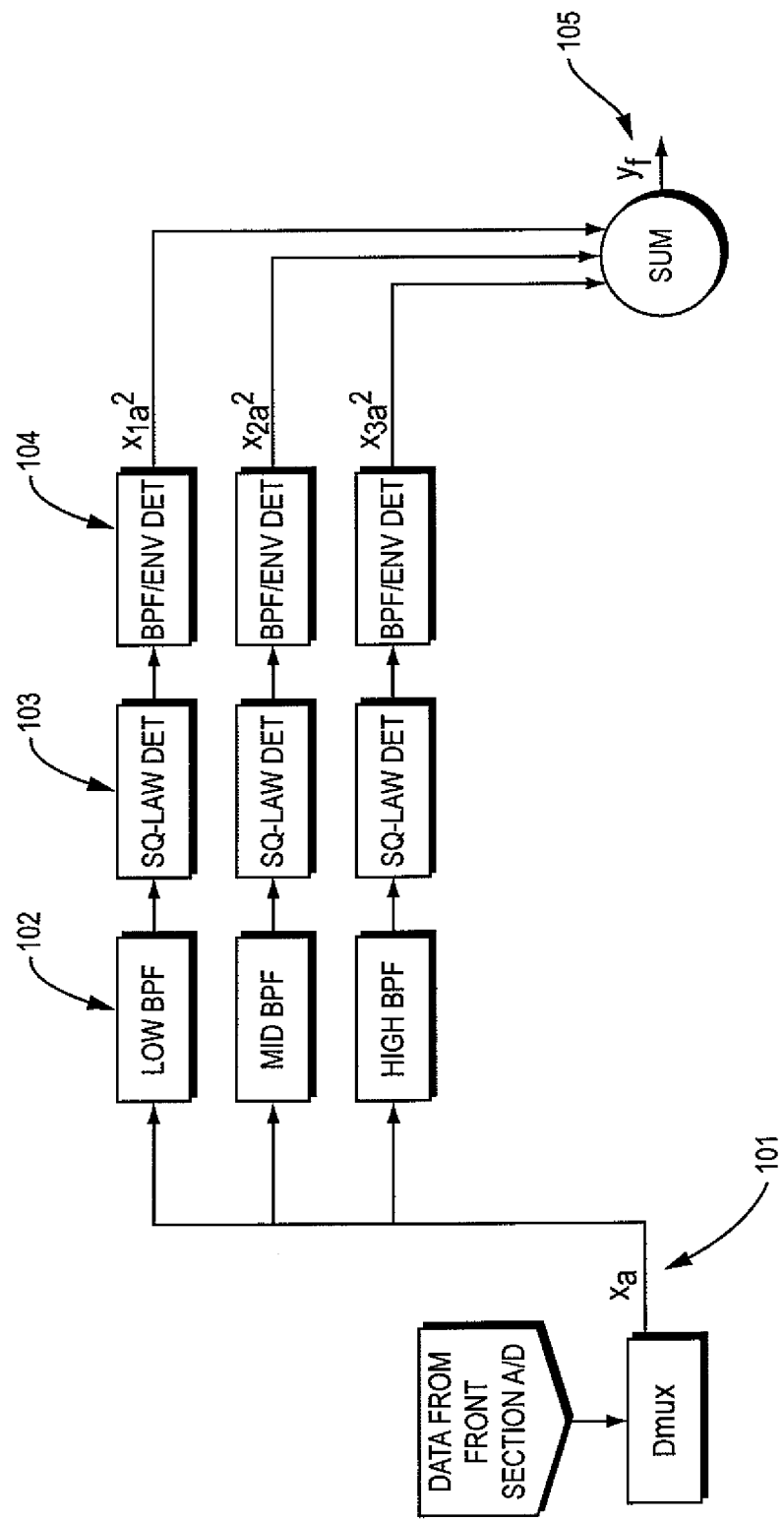
FIGS. 13A and B represent a block diagrams for the signal processing within the FPGA for the FPGA based implementation of the search and rescue system receiving wand.

This can be completely circumvented by using three antennas to transmit three separable or separate signals. Consider first the simplest implementation. Erect three dipole antennas which are orthogonal to each other as shown, for example in FIG. 7, three ferrite rod magnetic antennas fixed in orientation along three mutually perpendicular axes. From each, transmit a signal which is mutually orthogonal to the others; for example, three continuous sinusoids at three different frequencies such as 161, 162 and 163 kHz. Now at the receiver or wand 14, these signals can be separated by band pass filters 102 and envelope detected 103, 104 as shown in FIG. 13A. It can be shown that properly combining functions of these envelope amplitudes, a single combined value 105 also shown in FIG. 13A may be generated which is not a function of the orientation of the source transmitter 12. This can be proven by using Rumsey reaction theory to compute the coupling between pairs of dipole antennas from which it follows that the sum of the squares of the receiving antenna's voltages due to the near field components ($1/r^3$ terms) of the three orthogonal transmitter signals sums to a function of the receiver antenna's distance and orientation which is invariant to the tri-orthogonal transmitting antenna's orientation.

That is, if $x_1$, $x_2$, and $x_3$ 101, describe the amplitudes of the signals received at one antenna say the "front antenna" on the receiver rod or wand 14, then the combined front-antenna signal 105 $y_f = x_1^2 + x_2^2 + x_3^2$ is invariant over the tri-orthogonal transmitting antenna's orientation. Similarly for the rear combined received signal, $y_r$.

Figure 7:
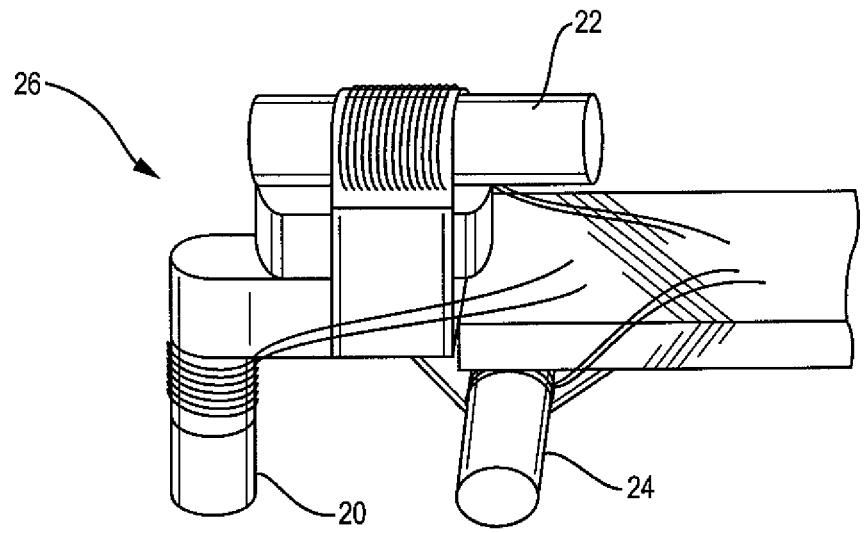
FIG. 7 represents tri-orthogonal rod antenna embodiment of the triple-signal transmitter antenna.

This combined value thus behaves with respect to distance and angle from the transmitter 14 as depicted in FIG. 7. Thus, while each transmitted signal is individually consistent with the ordinary behavior of a dipole antenna transmission, at the receiver a new indicator signal can be readily synthesized that mimics the received envelope from an otherwise unrealizable omnidirectional antenna.

As previously indicated, there are various alternative implementations based upon the above teaching. For example:

The three signals may be orthogonal by virtue of different sinusoidal carrier frequencies, by time division multiplexing, by code division multiplexing, etc.

The three signals need not be truly orthogonal nor must the three transmitting antennas be truly orthogonal. In fact they may depart entirely from orthogonality with the impact that the direction invariant combined signal is simply a more complex construction of the three received signals than described in the above example.

The transmitted signals may have additional functions beyond presenting the field amplitude information necessary to discern direction and distance; modulation may be introduced to also communicate information about system status, etc., or to allow for more exotic receiving solutions for improved signal to noise ratios than afforded by strict envelope detection.

Figure 8:
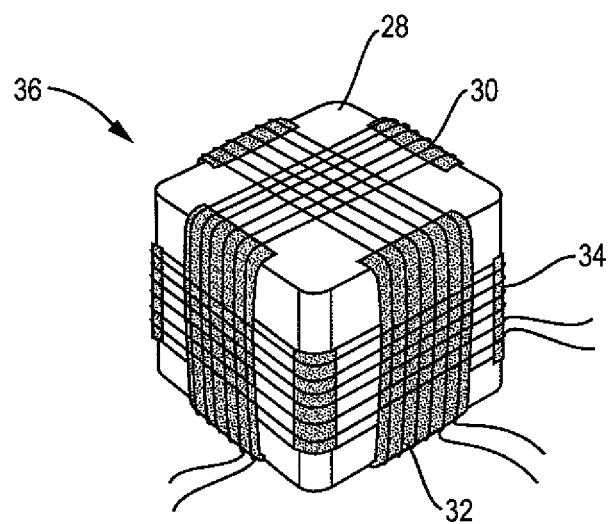
FIG. 8 represents tri-orthogonal triply-wound cube embodiment of the triple-signal transmitter antenna.

The tri-orthogonal antennas 20, 22, 24 may be implemented in a variety of fashions. FIG. 7 shows one embodiment in which three ferrite rod antennas 20, 22, 24 have been affixed to a frame 26 with orthogonal axes. FIG. 8 shows an embodiment in which a single cube 28 of ferrite has been wound with three orthogonal coils 30, 32, 34 to yield a tri-orthogonal antenna 36 which is smaller for a given efficiency that the former and for which all signals share the same source center.

The near field has a very rapid fall off of field amplitude (a function of $1/r^3$) as a function of radial distance (r) from a source (antenna). This is in considerable contrast to the $1/r$ fall off for the radiation field. Ordinarily the radiation field is the preferred mechanism for communication technology: its slow fall off with distance makes it possible to communicate at great distances.

However, this slow fall off also makes it difficult for a searcher to determine the correct direction in which to move in order to increase proximity to the source or missing firefighter 10. Enough distance has to be crossed to allow the rise or fall of signal strength to be determined.

The near field's very rapid fall off of field amplitude makes it a very poor choice for long distance communication, but it also makes it possible to determine both the relative distance from the source or transmitter 12 and direction to the source or transmitter 12 by sampling the value of the amplitude at two sufficiently separated points. In the current embodiment, the front end 29 and the rear or back end 31, respectively, of the receiving antenna as shown in FIG. 3B are placed at either on either end of a length of rod or wand 14, for example, but not limited to, approximately 1 meter apart. Because of the $1/r^3$ behavior of the near field and the resulting $1/r^4$ behavior of the difference between the amplitudes at the two end 29 and 31, this distance is sufficient to discern a difference between the two received signal amplitudes at distances up to at least 25 meters when the rod or wand 14 axis is aligned with the radial to the source or transmitter 12.

If the rod or wand 14 is rotated about its center away from alignment with the radial to the source or transmitter 12, the signal difference rapidly diminishes and becomes zero when the rod or wand 14 is perpendicular to the radial. Furthermore, if rotation continues so that the end of the receiving antenna that was closest to the transmitter 12 is now the further, its received signal now falls below that of the other.

Thus, standing at a single location, the user or searcher can ascertain the direction to the source or transmitter 12 without ambiguity as to which end of the axis is that which is closer to the source or transmitter 12. Given a well calibrated transmitter 12 and receiver or wand 14, the difference signal could be used to compute an estimate of the distance from the transmitter 12 to the receiver or wand 14. However, given effects of materials in buildings, etc., on the received amplitude, a preferred application is to use the difference as an indicator of relative distance and not absolute distance.

Figure 9:
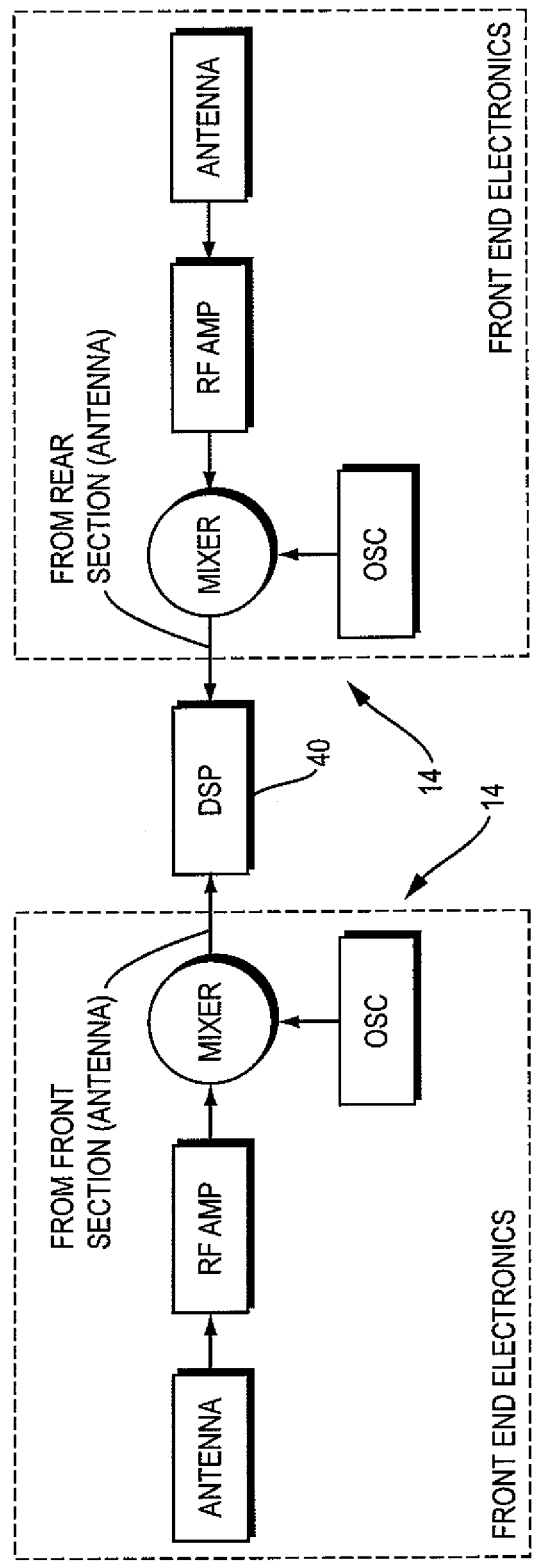
FIG. 9 represents a schematic block diagram of a single receiver antenna embodiment of the triple signal receiver embodiment.

The basic receiver structure or wand 14 supporting the reception of the signals from an antenna 26 or 36 at both ends 29 and 31 of the two-antenna rod or wand 14 is as outlined in FIG. 9. An analog front end heterodynes the radio band segment containing the three orthogonal signals to a lower frequency where it is sampled, digitized and processed by a Digital Signal Processor (DSP) 40. The digital signal processor 40 in this case performs the filter operations necessary to separate the three signals, obtain their envelopes and combine them into the source-orientation invariant signal. This receiver or wand 14 and signal processing structure is repeated for the antenna at the other end of the receiver rod and the two signals are used to determine the distance/direction information.

Figure 10:
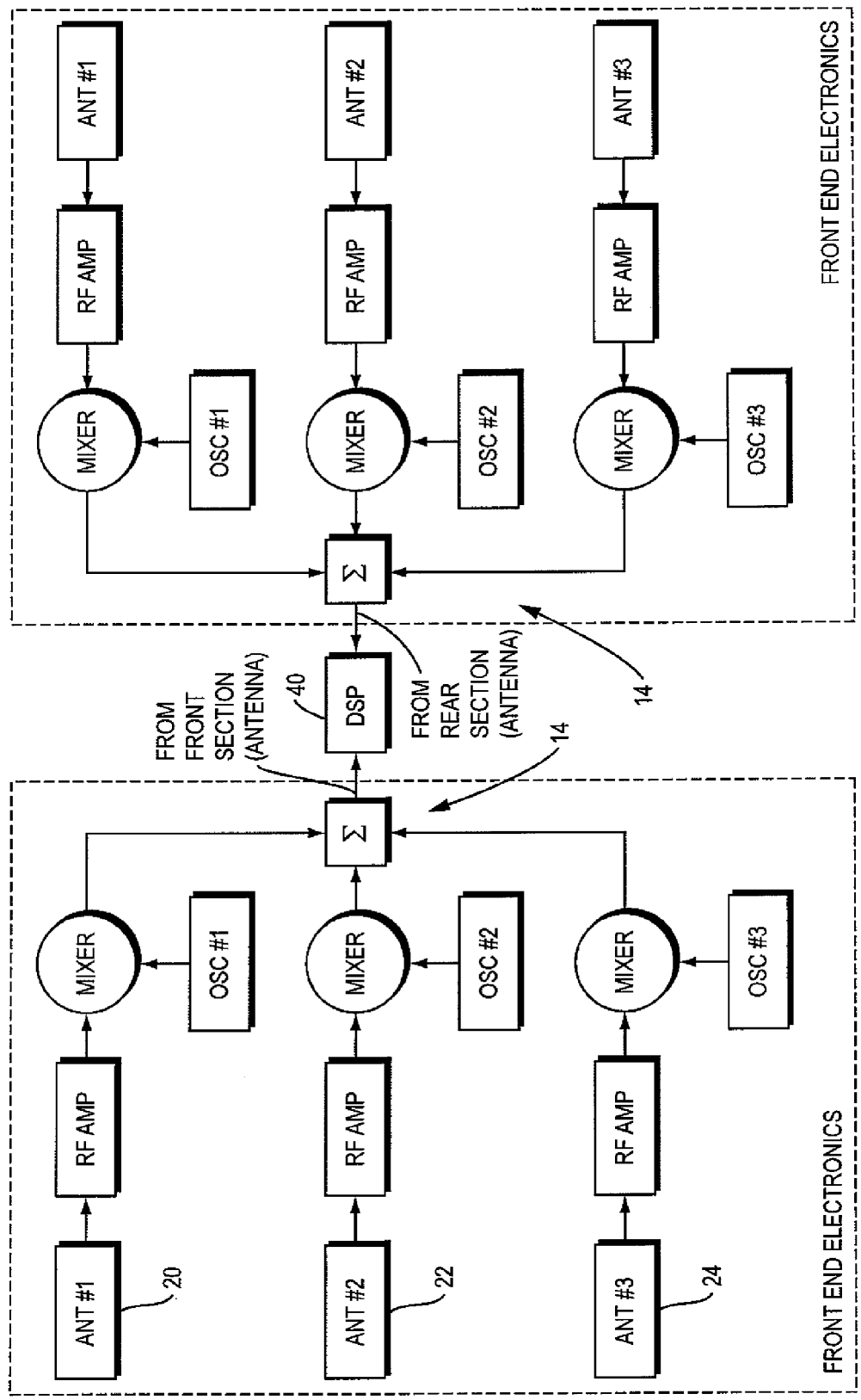
FIG. 10 represents a schematic block diagram of a tri-orthogonal receiver antenna embodiment of the triple signal receiver embodiment.

In some circumstances benefit can be derived from having tri-orthogonal receiving antennas at both ends of the receiver rod or wand 14 with the additional electronics supporting reception from the orthogonal antennas 20, 22, 24 as shown in FIG. 10. This is advantageous, for instance, when a search is being conducted in a building with ferrous panels on walls, or on the floor and ceiling (such as in steel pan construction). In such circumstances the transmitted signal's magnetic field lines tend to run between the panels. It has been found that a receiver or wand 14 that combines signals from the three antennas at end of the receiving wand 14 in the same fashion as it combines the three signals from the transmitter 12 for each antenna 26 or 36 will behave directionally in this circumstance just as it did for a single receiving antenna in the case of no ferrous panels. In effect, this approach synthesizes an apparently omnidirectional antenna at the receiver. That is, if $x_{1a}$, $x_{2a}$, and $x_{3a}$, describe the amplitudes of the signals received at one (a) of the now three front antennas 20, 22, 24, or 30,32,34, and similarly $x_{1b}$, $x_{2b}$, and $x_{3b}$, and $x_{1c}$, $x_{2c}$, and $x_{3c}$, for the other two front antennas, then the combined front-antenna signal, 105 shown in FIG. 13B $y_f = x_{1a}^2 + x_{2a}^2 + x_{3a}^2 + x_{1b}^2 + x_{2b}^2 + x_{3b}^2 + x_{1c}^2 + x_{2c}^2 + x_{3c}^2$ is invariant over the tri-orthogonal transmitting antenna's orientation and the receiving antennas orientation. Similarly, signals from the rear antenna 31 are combined to form the rear received signal, $y_r$. Thus, only the distance separating the front and rear antennas from the source determine the difference value $y_f - y_r$.

The signal processing which is performed is summarized in the following. As discussed above, several variations of receiver structure that are possible. In the following only one, more complex, structure involving a receiver with a tri-orthogonal antenna will be discussed in detail as the single antenna variation follows by simple deletion of the additional two signal paths at either end of the receiver wand. Furthermore, only a receiver structure based upon digital signal processing will be described while recognizing that any subsection of the receiver can be implemented either with analog circuits or by digital circuits.

Figure 12:
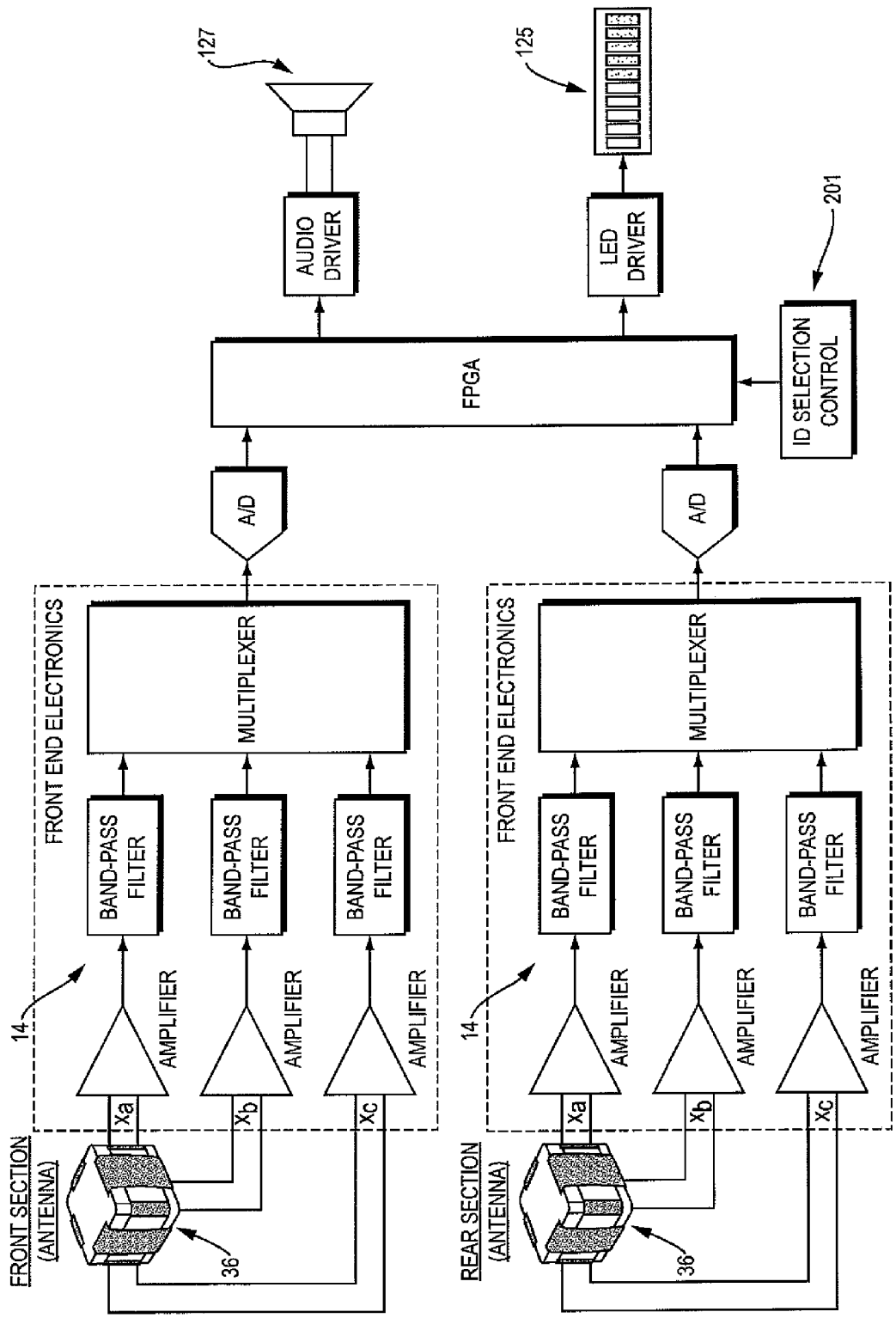
FIG. 12 represents a schematic block diagram of FPGA based implementation of the receiving wand of the embodiment with tri-orthogonal receiving antennas and front ends and unique ID selection capability.

The three signals transmitted by the source or transmitter 12 are received by each receiver dipole antennas 20, 22, 24, or 30, 34, 36, that make up the complex tri-orthogonal antennas at either end of the wand. Well known means are applied to possibly down convert, digitize and possibly multiplex the received signals in the receiver front ends 14 (with 14 being used for simplicity to not only represent the wand but also all front end implementations, no matter the variations. Thus, front ends 14 will appear within the dashed boxes in FIGS. 9, 12 and 15) to obtain the data streams for conveyance to the digital signal processing section of the receiver 40. Some of the possible variations are illustrated in FIGS. 10, 12 and 15 Within the digital signal processing structure any multiplexing of the signals within the receiver front and originally at the transmitter must be reversed to effect separation into nine individual signal components for the front antennas and nine signals for the rear antenna. These nine signals correspond to the three distinct signals transmitted by the beacon as received by each of the three antennas at each of the three antennas at an end of the receiver. By way of explanation a particular example is illustrated in FIG. 13 where an initial data demultiplexer yields the three signals $x_a$, $x_b$, and $x_c$ 101 that represent the signals from the three receiving antenna at one end of the receiver wand. Subsequently the band pass filters 102, effect separation of the three distinct components of $x_a$, $x_b$, and $x_c$ which are due to the contribution to each of the three distinct signals transmitted by the beacon, supposing in this instance that distinct carrier frequencies were used to form the three distinct signals at the transmitter. Each of the nine signals must undergo a detection operation which yields individual signal amplitude representations. This may be accomplished for a modulated transmitted signal by means of, but not limited to, square-law detection 103 and bandpass filtering followed by envelope detection 104 resulting in formation of values corresponding to the squares of the amplitudes of the original received signal components, or for an unmodulated signal by means of envelope detection alone followed by a squaring operation. The squares of the nine individual signal component amplitudes may now be summed to form a single amplitude $y_f$ from processing the signals from the front of the wand and $y_r$ resulting from applied the same processing to the nine signal components obtained in the same fashion as above from processing the three antenna signals obtained from the antenna complex at the rear of the wand. The outcomes $y_f$ and $y_r$ are the transmitter orientation and receiver orientation invariant representations of field strengths required for subsequent processing. The subsequent processing is described by FIG. 14. First, if noise cancellation is to be used, the signal amplitudes obtained by means identical to those applied to obtain the desired signal amplitudes, that is as detailed in FIG. 13 are applied again but this time with bandpass filters 102 chosen to not overlap the spectral location of any of the transmitted signals and hence only representing the amplitudes of ambient noise in the spectrum nearby the transmitted signals. The outcomes of this additional processing will be called $n_f$ and $n_r$ respectively for the case of noise received at the front and rear antenna complexes, respectively.

The difference between the desired signal amplitudes and the noise signal amplitudes can be used to reduce the size of any final indicator signal by approximate compensation or removal of the effects that noise has on the desired signal amplitude estimates, $y_f$ and $y_r$. For example, if the gain and bandwidth of the noise receiving channel is adjusted so that $y_f = n_f$ and $y_r = n_r$ in the presence of only a noise source, then the difference values $(y_f - n_f)$ and $(y_r - n_r)$ form a good representation of what the desired signal amplitude estimates would have been in a noise free environment.

Thus, the front and rear noise amplitude values are first subtracted from the desired signal amplitudes 120 for the front and rear signals, respectively. Next the front and rear difference signals 121 are subtracted, or otherwise compared, to obtain a value representing a comparison of the total, noise compensated, signal strengths at the front and rear of the wand. If the front signal is larger than the rear signal as determined for example by a processing block such as 122, indicating that the wand it pointed in generally the correct direction, it may be passed to the next, indicator processing, structures or software within the receiver 123. The indicator processing would typically begin by low pass filtering 123, the aim of which is to smooth out rapid variations in apparent signal strength due to bursts of man-made noise, etc. Typically a low pass filter bandwidth of 1 to 5 Hz is appropriate as it sufficiently masks noise burst effects while permitting sufficiently fast response to desired amplitude changes caused by the movement of the wand by the user so as to provide a usable level or responsiveness to the movements for the user to obtain a sense of which direction is best in which to proceed with a search. The resulting signal can now be used to drive any number of indicator devices which provide cues to the operator of the wand as to the preferred direction for further search which would lead directly to the transmitter beacon.

Figure 14:
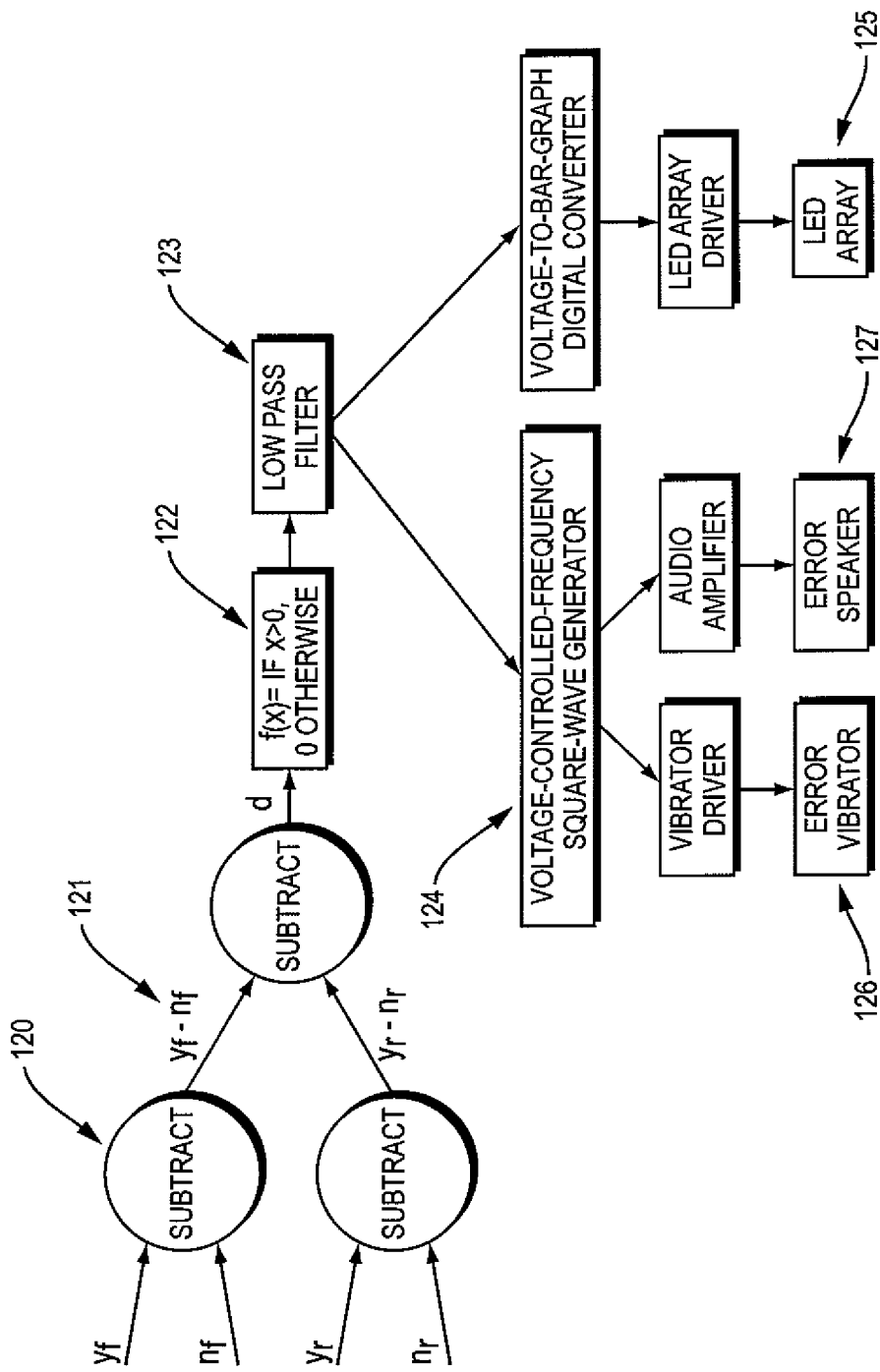
FIG. 14 represents a schematic, block diagram of a second part of the block diagram for the signal processing within the FPGA based implementation of the search and rescue system receiving wand which combines the front and rear signal envelopes and noise envelopes to compute the overall signal status for display.
Figure 15:
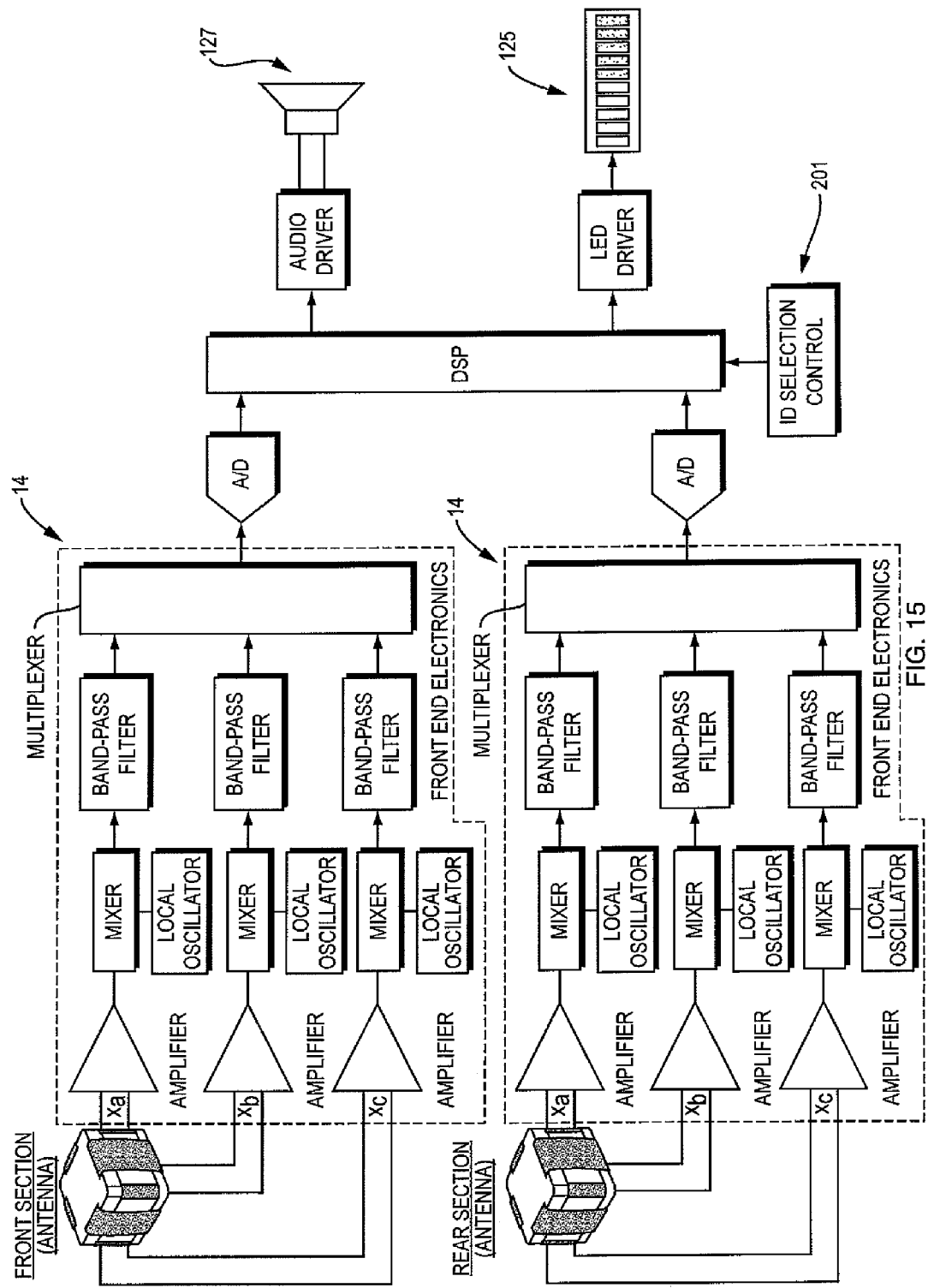
FIG. 15 represents a search and rescue system receiving wand implementation based upon a combination of analog front end electronics and a general purpose DSP device.

As shown in FIG. 14, the indicator signal issuing from the low pass filter 123 can be used to:

(a) Set the tone or volume of an audio signal by means, for example, of a voltage controlled frequency waveform generator 124. The indicator waveform generator may have additional functionality, for example, setting a higher pitch, pulse rate or volume to indicate that the user is pointing the rod in the correct direction and or indicating the distance to the source has been reduced. The resulting indicator waveform may then be amplified and used to drive a speaker or error speaker 127 which is integral to the wand 14 or to drive other sound generating devices on or remote from the wand 14.

(b) Set an indicator light (in the form of, for example, but not limited to, a LED array) 125 to indicate (as by becoming brighter, lighting more lights, etc.) pointing of the rod in the correct direction and or indicating the distance to the source has been reduced.

(c) Set a vibrator or error vibrator 126 into motion causing a vibration of the receiver wand 14 for tactile information to be felt by the user for the same purposes as with the other indications.

In practice there may be many transmitters active at once which must be located. Separation of the various transmitter signals for the purposes of avoiding confusion from multiple signal peaks observed during the homing process can be supported by assigning each transmitter its own unique set of three carrier frequencies (in the case of a simple sinusoidal carrier based signal scheme) or three signals which are otherwise mutually orthogonal with each other and with the signals selected for every other transmitter. The receivers may now use classic filtering or correlation-receiver structures to separate these orthogonal signals. A signal selection control would be adjusted by the user to select the desired transmitter for homing.

Another example of a particularly simple implementation is one in which every transmitter uses the same three carrier frequencies, but each can select a different modulation with which the signals can be separated at the receiver after demodulation, e.g. by using amplitude modulation by a selectable tone and separating the signals by an appropriately selected band pass filter after demodulation.

One effective implementation of transmitter selection/ unique ID is described here:

Each transmitter carrier (three carriers are transmitted, one for each orthogonal magnetic dipole antenna) is double-sideband suppressed-carrier (DSB-SC) modulated using an appropriate amplitude modulation scheme implemented in the RF amplifier 200 shown in FIG. 11 with a single, unique sinusoidal tone.

The receiver may use a square law demodulator to form a signal consisting of the modulation waveforms of all transmitters that are currently transmitting in a given channel. Because of the carrier-less nature of a DSB-SC signal, no carrier beat signals will form from interference between multiple transmitter signals with slightly offset carrier frequencies.

A narrow band pass filter and envelope detector 104 shown in FIG. 13, with the filter centered on each unique modulating sinusoid's frequency may now be applied to the demodulated signals and serve to separate the signals for selection purposes.

Because of the $1/r^3$ behavior of the near field, all of the receive chain electronics and data paths must be capable of faithfully representing signals over an extremely large dynamic range in typical applications. For example, to home in on a transmitter over a range from 1 foot to 100 feet entails reception of a signal with a dynamic range of approximately 120 dB. One means to accomplish this is via automatic gain control. However, since approximately 8 signals would be typically involved in the reception and indicator signal processing (three signal channels and one noise channel, from both the front and rear antennas), any one of which may be strong or weak in a given instance, special care must be taken. Independent automatic gain control must be implemented for all channels, and the selected gain for each channel must be fed forward to the indicator processing subsystem for compensation of that gain setting before the various signal envelopes may be properly combined.

To support search and rescue operations such as in the fire fighting services, a motion sensor as shown in FIG. 11 may be included in the transmitter design so lack of motion (as due to unconsciousness) will automatically trigger the transmitter device.

The range over which useful direction and distance information can be obtained is a function of the length of the wand 14 as it depends upon the distance between the antennas 29 and 31 at either end of the wand 14. However, a wand 14 which is too long to be held by a first responder and swung over a significant arc while in the typical confines of a building has greatly reduced utility; hence a compromise length, for example, but not limited thereto, of approximately 3 feet which accommodates motion and a useful range of, for example, but not limited thereto, approximately 50 to 75 feet under most circumstances (varying with building materials and construction). However, a much larger range of operation can be obtained for use prior to building entry as part of an initial search strategy seeking to narrow the indoor search region. This enhanced operation can be obtained by allowing the wand 14 to telescope, so that it can be enlarged where the local surroundings permit, and collapsed when they do not. The length of the wand can measured by appropriate sensors incorporated into the wand so that information about this distance between the antennas at either end 29 and 31 can be used by the system's software or hardware to compensate appropriately for the new length parameter.

It may be beneficial in certain circumstances to eliminate the mechanical wand assembly and apply the two antenna systems and receiver electronics to separated locations on a body (such as the human body, vehicle body, robot body, missile body, etc.) Thus a land, air or sea-going vehicle or robot can use this technology to seek out a target to which a transmitter has been affixed (for purposes of rescue, delivery of materials, transport, etc.)

As in the body fixed antenna system, the two antenna-groups may be fixed to parts of an articulating body, such as the head and feet of a person, the chassis and turret of a vehicle, etc. Since the distances between and orientations of the two antenna-groups is no longer fixed, the ability to determine distance and direction to a transmitter might be compromised without further accommodation of this flexible geometry. Such further accommodation can take (but is not limited to) the following form: Small signals outside that monitored by the receivers for detection of the target transmitter, can be transmitted from each independent antenna in each antenna group and similarly received by each other antenna of each antenna group. The amplitudes of this collection of received signals can be used to solve for distance and orientation between each group. From this information, direction and distance solutions for the target transmitter may be obtained.

While all the above describes the case of signals transmitted and received by magnetic dipole antennas, as an antenna with a particularly large magnetic near field pattern is helpful for deep penetration of conductive layers of material, any of the above technology can be applied, where the environment is such to recommend it, to the case where an antenna is used in which the electric near field component predominates. Similarly, an antenna with arbitrary mix of electric and magnetic field components may be applied.

The preceding descriptions were all given in the context of a receiver configuration with two antenna groups separated by some distance. However, there is utility if the application uses more than two antenna groups, arranged in an arbitrary fashion (that is, not necessarily in a line). For example, an antenna group could be fixed to each major extremity of a person or a vehicle. In this case, more sophisticated processing is required to fuse the various pieces of amplitude information from each individual antenna into a single measure of distance and angle between the receiving group of antennas and the target transmitter.

An example of a software radio implementation of the transmitter and receiver circuits using microprocessor and/or field programmable gate array (FPGA) technology is shown in the following diagrams and algorithmic flow charts.

FIG. 11 represents a microcontroller or FPGA embodiment of transmitter 12 with modulation capability. Modulation supports both improved noise performance implementation and supports unique ID selection capability.

An FPGA implementation of the receiver wand is shown in FIG. 12. This implementation features the support of the full tri-orthogonal receiving antennas 26 or 36 and supporting electronics for both ends 29 and 31 of the wand 14. FIG. 14 shows the error speaker and LED array, 127 and 125, respectively, needed to support the audible alerts and visual alerts, respectively, which are used for the user to understand the direction and distance to the target transmitter 12. Shown in FIG. 15 is support for a unique ID selection control 201.

Figure 13B:
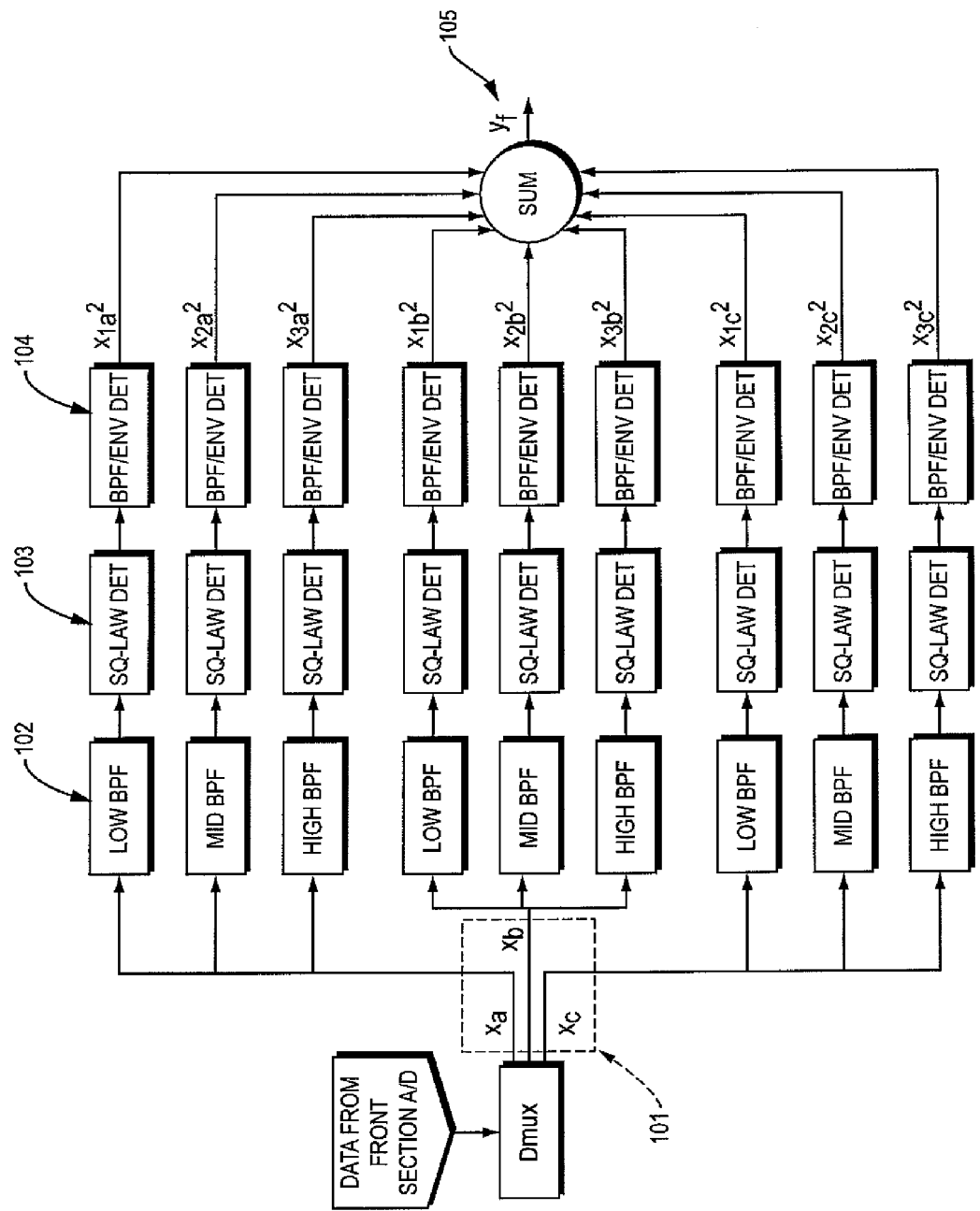

Note, for purposes of brevity, the receiver shown in FIGS. 13A and 13B and 14 do not show explicit noise rejection circuitry or processing circuitry as previously described as this is implemented within the digital signal processing level inside the FPGA from the signals already depicted in these figures. Processing within the FPGA proceeds as previously described and shown in FIGS. 13A and B and 14.

Although the invention has been described with respect to various embodiments, it should be realized this invention is also capable of a wide variety of further and other embodiments within the spirit and scope of the description. An entirely analog receiver circuit implementation is also possible. The various DSP implemented demodulation steps, narrow band filters and other systems can be translated into analog or digital circuit equivalents. Also, although lost fire fighters within a firefighting scenario are mainly described above, it should be realized that the system described herein may also be used to locate a wide variety of objects such as, for example, first responders or the like which are located in areas where the visibility is poor.

Other improvements could involve further application of the information about direction and distance as determined by the position and orientation of the wand. For example, a short range data transmitter could send the indicator signal from the wand back to the target being sought. A data receiver at the target could use this information to induce an additional circuit at the target to produce a burst of piercing sound, or an intense light when the searching was sufficiently near and pointing directly at the target. This would further enhance the ability to close in on the target rapidly in otherwise visually confusing situations.

Another embodiment may have a feature that allows the user of the search wand to suppress, by push button or some other control, the audio, visual or vibration alert when they choose. This would allow them to suppress sounds from the wand when they need to hear communication from their radio, speak to a nearby user or to listen for indications of proximity to the victim for which they are searching. Similarly, suppressing the lights or vibration may aid in using other visual search devices or feeling for vibrations in a building that may be signs of floor or wall collapse.

Although the invention has been described with respect to various embodiments, it should be realized this invention is also capable of a wide variety of further and other embodiments within the spirit and scope of the appended claims, such as, for example, with appropriate modification the present invention could be used for underwater sensing of missing objects such as swimmers or ships.

What is claimed is:

1. A method for locating a transmitter using a receiver, comprising the steps of:
   transmitting at least three distinctive and mutually orthogonal signals from a transmitter, the at least three distinctive and mutually orthogonal signals having a frequency of most 200 kHz;
   receiving, in a near field region, the transmitted at least three distinctive and mutually orthogonal signals at each one a pair of separated antennas; hereinafter referred to as the at least three distinctive and mutually orthogonal signals received at said each one of the pair of separated antennas; each one of the pair of separated antennas being located at separate ends of a linear structure; the linear structure being configured to be handheld;
   demodulating the at least three distinctive and mutually orthogonal signals received at said each one of the pair of separated antennas; producing at least three demodulated signals corresponding to said each one of the pair of separated antennas;
   obtaining, after demodulating, for said each one of the pair of separated antennas, from the at least three demodulated signals corresponding to said each one of the pair of separated antennas, a transmitting antenna orientation invariant signal corresponding to said each one of the pair of separated antennas;
   determining a direction to the transmitter from the transmitting antenna orientation invariant signal obtained for said each one of the pair of separated antennas; and
   providing an indicator signal indicating proximity and distance to the transmitter;
   whereby the method enables rescue of a first responder in almost any type of building including fully metallic buildings.

2. The method of claim 1, wherein the step of obtaining includes combining, for said each one of the pair of separated antennas, signal amplitude levels of the at least three demodulated signals corresponding to said each one of the pair of separated antennas; thereby obtaining for a combined signal amplitude level corresponding to said each one of the pair of separated antennas.

3. The method of claim 2, further comprising indicating to a user a difference between the combined signal amplitude level corresponding to one of the pair of separated antennas and the combined signal amplitude level corresponding to another one of the pair of separated antennas.

4. The method of claim 2, wherein the noise is received at said each one of the pair of separated antennas; and, wherein the step of determining includes using received noise levels for adjusting the combined signal amplitude levels.

5. The method of claim 2, wherein the step of determining includes aligning the pair of antennas to maximize the difference between the combined signal amplitude levels of the pair of antennas to estimate a direction to the transmitter.

6. The method of claim 4, further comprising the step of estimating a distance to the transmitter from the receiver from the difference in the combined signal amplitude levels.

7. The method of claim 1, wherein the step of transmitting uses three orthogonally polarized signals.

8. The method of claim 6, wherein the step of transmitting uses three magnetic dipole antennas or three electrical dipole antennas.

9. The method of claim 1, wherein the step of transmitting includes varying the distinctive signals by different frequencies, by time division multiplexing or by code division multiplexing.

10. The method of claim 9, wherein the step of varying the distinctive signals includes sufficient distinction to enable differentiation between a plurality of transmitters in the step of receiving.

11. The method of claim 1, wherein the step of receiving uses gain control circuits for receiving the transmitted signals.

12. The method of claim 11, wherein the step of determining uses algorithmic compensation for processing near-field portions of the transmitted signals.

13. The method of claim 1, wherein the step of transmitting is activated by a predetermined period of non-movement of the transmitter.

14. The method of claim 1 wherein the transmitter is located with respect to an object to be located and where the receiver is located with respect to the user.

15. The method of claim 14 wherein the object is a firefighter.

16. A system for determining the location of a transmitter using a receiver, comprising:
   a transmitter adapted for orthogonally transmitting at least three distinctive signals; the at least three distinctive signals having a frequency of most 200 kHz;

a receiver having a pair of separated antennas for receiving, in a near field region, the at least three orthogonally distinctive transmitted signals; each one of the pair of separated antennas being located at separate ends of a linear structure; the linear structure being configured to be handheld;

separate demodulators in the receiver for each one of the pair of separated antennas for demodulating the at least three distinctive signals received at said each one of the pair of separated antennas;

first signal processing circuitry in the receiver adapted for obtaining a transmitting antenna orientation invariant signal corresponding to said each one of the pair of separated antennas; and second signal processing circuitry in the receiver adapted for using the transmitting antenna orientation invariant signals corresponding to said each one of the pair of separated antennas for determining a direction to the transmitter and providing indicator signal indicating proximity and distance to the transmitter;

whereby the system enables rescue of a first responder in almost any type of building including fully metallic buildings.

17. The system of claim 16, wherein the first signal processing circuitry is adapted to combine signal amplitude levels of the separate demodulated signals received for each respective antenna.

18. The system of claim 17, further comprising an indicator adapted to show a user of the receiver the relative difference between combined signal amplitude levels between the pair of separated antennas.

19. The system of claim 17, wherein the signal processing circuitry is adapted to use received noise levels for adjusting the combined signal amplitude levels.

20. The system of claim 17, wherein the pair of separated receiving antennas may be oriented with respect to each other to maximize the difference between the combined signal amplitude levels of the pair of separated antennas to estimate a direction to the transmitter.

21. The system of claim 17, wherein the second signal processing circuitry is adapted to estimate a distance to the transmitter from the receiver from a maximized difference in the combined signal amplitude levels.

22. The system of claim 16, wherein the pair of separated receiving antennas are mounted to a single instrument to enable easy directional reorientation.

23. The system of claim 16, wherein the pair of antennas is mounted to the receiver using at least one extendable member to provide separation between the pair of antennas during use and for compacting the receiver between uses.

24. The system of claim 16, wherein the transmitter includes three orthogonally oriented antennas for transmitting three orthogonal signals.

25. The system of claim 16, wherein the three transmitting antennas are three magnetic dipole antennas or three electrical dipole antennas.

26. The system of claim 16, wherein the three orthogonally oriented antennas are three coils wound around a cube form, orthogonally to each other.

27. The system of claim 16, wherein the transmitter is adapted to create the distinctive signals by using either different frequencies, time division multiplexing or code division multiplexing.

28. The system of claim 27, wherein the distinctive signals are sufficient to enable distinction there between and between a plurality of transmitters at the receiver.

29. The system of claim 16, wherein the receiver includes gain control circuits for receiving near-field portion of the transmitted signals.

30. The system of claim 29, wherein the first signal processing circuitry includes algorithmic compensation for processing the near-field portion of the transmitted signals.

31. The system of claim 16 wherein the transmitter is located with respect to an object to be located and where the receiver is located with respect to the user.

32. The system of claim 31 wherein the object is a firefighter.

* * * * *

UNITED STATES PATENT AND TRADEMARK OFFICE
CERTIFICATE OF CORRECTION

| | | |
|---|---|---|
| PATENT NO. | : 9,476,963 B2 | Page 1 of 1 |
| APPLICATION NO. | : 13/642319 | |
| DATED | : October 25, 2016 | |
| INVENTOR(S) | : David Cyganski et al. | |

It is certified that error appears in the above-identified patent and that said Letters Patent is hereby corrected as shown below:

In the claims

In column 15, line 49 (claim 1), "frequency of most" should read -- frequency of at most --

In column 15, line 52 (claim 1), "each one a pair" should read -- each one of a pair --

In column 16, line 67 (claim 16), "frequency of most" should read -- frequency of at most --

In column 17, line 32 (claim 19), "wherein the signal" should read -- wherein the first signal --

Signed and Sealed this
Twentieth Day of December, 2016

Michelle K. Lee
*Director of the United States Patent and Trademark Office*